United States Patent [19]

Arnaud et al.

[11] Patent Number: 5,462,596
[45] Date of Patent: Oct. 31, 1995

[54] APPARATUS FOR THE DISTRIBUTION OF PULVERULENT SOLIDS ONTO THE SURFACE OF A SUBSTRATE IN ORDER TO COAT IT

[75] Inventors: Alain Arnaud, Versailles; Claude Morin, Puteaux, both of France

[73] Assignee: Saint-Gobain Vitrage International, Courbevoie, France

[21] Appl. No.: 199,633

[22] Filed: Feb. 22, 1994

[30] Foreign Application Priority Data

Feb. 25, 1993 [FR] France .................... 93 02136

[51] Int. Cl.⁶ .............. B05B 7/14; C03C 17/00; B05D 1/36
[52] U.S. Cl. ........... 118/310; 118/315; 118/325; 65/60.1; 65/60.2; 239/549; 239/552; 427/201; 427/203; 427/189; 427/165
[58] Field of Search .............. 118/310, 308, 118/314, 315, 325, DIG. 4; 427/201, 203, 189, 180, 193, 202, 168, 165, 166; 65/60.1, 60.2; 239/549, 552, 556; 222/478

[56] References Cited

U.S. PATENT DOCUMENTS

| | | | |
|---|---|---|---|
| 2,499,218 | 2/1950 | Hess | 239/549 |
| 2,901,770 | 9/1959 | Beck | 156/243 |
| 4,533,571 | 8/1985 | Kramer et al. | 118/311 |
| 4,537,801 | 8/1985 | Takeda | 118/410 |
| 4,801,086 | 1/1989 | Noakes | 239/549 |
| 4,837,093 | 6/1989 | Coulon et al. | 428/432 |
| 4,933,211 | 6/1990 | Sauvinet et al. | 118/310 |
| 5,005,769 | 4/1991 | Sauvinet et al. | 118/308 |
| 5,072,688 | 12/1991 | Chino et al. | 118/325 |
| 5,097,792 | 3/1992 | Umemura et al. | 118/325 |
| 5,167,986 | 12/1992 | Gordon | 65/60.2 |

Primary Examiner—W. Gary Jones
Assistant Examiner—Steven P. Griffin
Attorney, Agent, or Firm—Oblon, Spivak, McClelland, Maier & Neustadt

[57] ABSTRACT

An apparatus for the distribution of pulverulent solids suspended in a gas on a moving substrate, particularly a ribbon of glass, has two walls defining a strip-like cavity positioned transversely to the substrate travel direction and ending in the vicinity of the substrate in a distribution slot. The cavity is provided with at least one partition positioned so as to longitudinally compartmentalize it, each of the compartments being coupled with pulverulent solid injectors and pressurized gas injectors.

17 Claims, 2 Drawing Sheets

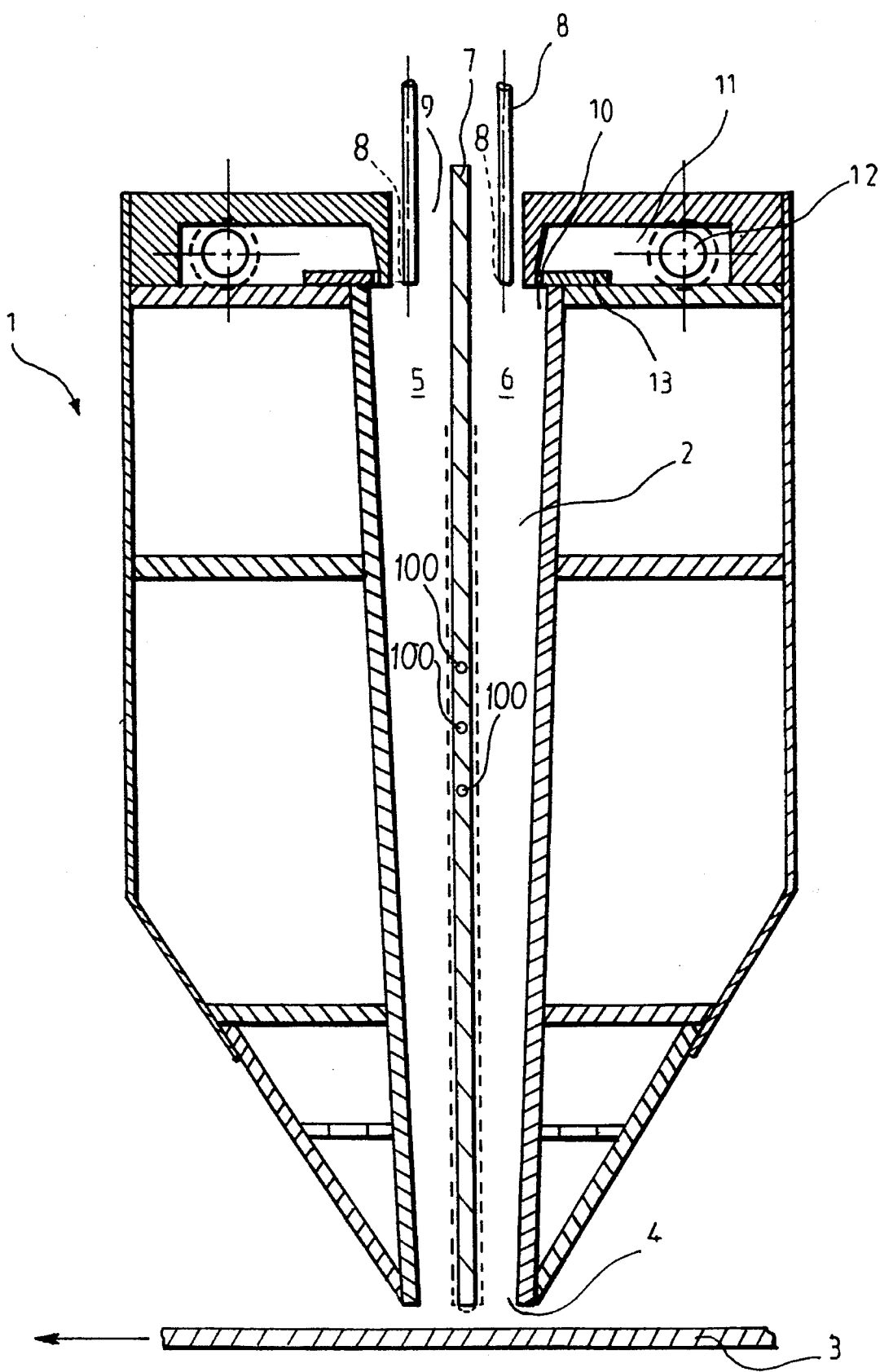
FIG_1

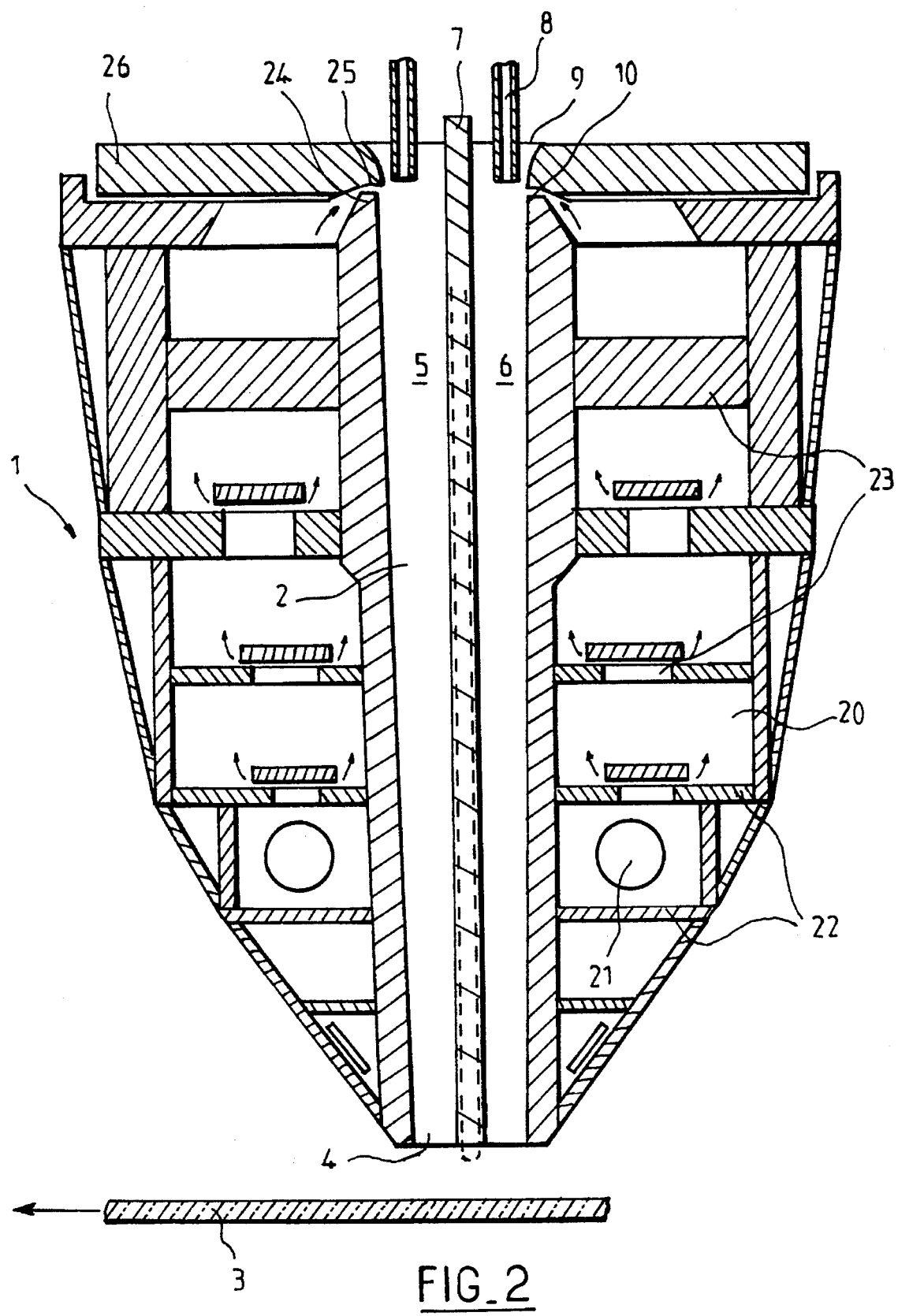
FIG_2

APPARATUS FOR THE DISTRIBUTION OF PULVERULENT SOLIDS ONTO THE SURFACE OF A SUBSTRATE IN ORDER TO COAT IT

BACKGROUND OF THE INVENTION

1. Field of the Invention

The present invention relates to an apparatus for the distribution of pulverulent solids onto the surfaces of a glass substrate, in order to coat it with thin layers giving it optical, thermal and/or electrical properties. This apparatus more particularly makes it possible to deposit thin layers or films by so-called pyrolysis process consisting of spraying said pulverulent solids suspended in a gas in the direction of a substrate heated to a high temperature, so that they decompose into oxides on contact therewith. The substrate can be in the form of a continuous float glass ribbon. The distribution apparatus has a cavity terminating as a distribution slot in the vicinity of the ribbon and positioned transversely to its movement axis.

2. Discussion of the Related Art

In order to obtain thin, homogenous and regular layers, it is necessary for the distribution apparatus to ensure a good powder-gas homogenization and a good distribution of said mixture over the entire length of the distribution slot.

Two apparatuses meet these criteria. Thus, EP-B-125 153 discloses a pulverulent solid distribution nozzle whose length can correspond to the width of the substrate to be treated and which has a longitudinal cavity whose walls regularly converge in the direction of the substrate to be treated. In its upper part, the nozzle has a plate forming a cover for the cavity. The plate has an opening permitting the supply of powder suspended in a gas, called the primary gas, by separate supply pipes. The powder supply pipes are located in said opening over the entire length of the nozzle and are, e.g., reciprocally spaced by approximately 50 mm, so as to introduce powder over the entire length of the cavity. Said supply pipes are not tightly fixed in said opening, which makes it possible for gas or more generally air from the ambient atmosphere to enter the cavity of the nozzle. The longitudinal walls of the cavity and the plate forming the cover define, in the upper part of the nozzle, two slots which extend over the entire nozzle length and by which are introduced pressurized supplementary gases known as secondary gases. The secondary gas is injected at a speed well above that of the primary gas in which the pulverulent product is suspended. This high speed makes it possible to accelerate the displacement movement of the pulverulent product towards the outlet slot of the nozzle and aids the uniform distribution of the injected gas flow over the entire length of the nozzle. Thus, the secondary gas also entrains the gas or air of the ambient atmosphere (induced air or gas) thus permitting the formation of turbulence, which aids the homogenization of the gas-pulverulent product mixture.

U.S. Pat. No. 5,005,769 also discloses a distribution apparatus having, as hereinbefore, two walls defining a strip-like cavity, provided in the upper part with an orifice in which are located a line of injectors for a pulverulent solid suspended in a gas, and a gas (and in particular ambient air) intake adjacent to said injectors. The cavity is also equipped with pressurized gas injection means having a chamber supplied with pressurized gas and issuing into the cavity by an opening arranged so as to inject the gas in the direction of the substrate, substantially parallel to the wall of the cavity adjacent to said opening. The opening is preferably constituted by a plurality of apertures having an axis substantially parallel to the wall of the cavity adjacent thereto.

Although both of the aforesaid apparatus types are satisfactory, each of them is only able to deposit a single layer, whereas it is an ever more frequent occurrence to provide glass substrates with a stack of plural thin layers. Thus, if it is wished to deposit several layer successively, e.g., on a continuous glass ribbon, using a pulverulent solid pyrolysis method, the only solution up to now has been to juxtapose several apparatuses along the ribbon movement axis, which leads to numerous inconveniences.

Thus, in a float glass installation, deposits by powder pyrolysis are usually performed on the glass ribbon between it leaving the float glass enclosure and its entry in the lehr, i.e., a zone often having very restricted dimensions. If it is wished to position several distribution apparatuses successively above the glass ribbon, this can lead to considerable difficulties and may even be impossible due to their dimensions.

Even when space is adequate, having successively depositing on the glass ribbon coatings at different locations of the float glass installation may make it necessary to carry out a glass reheating operation between two depositions, which makes the design of the installation more complicated.

SUMMARY OF THE INVENTION

An object of the present invention is to obviate the aforementioned disadvantages by developing pulverulent solid distribution apparatuses making it possible to deposit on a substrate a plurality of thin layers, while at the same time having reduced overall dimensions.

The apparatus according to the invention used for the distribution of pulverulent solids suspended in a gas on a moving substrate, particularly a glass ribbon, comprises two walls defining an elongate cavity positioned transversely to the substrate movement direction and ending in the vicinity of the latter as a distribution slot. This cavity is also equipped with at least one partition located in such a way as to longitudinally compartmentalize it, each of the compartments being equipped with means for injecting the pulverulent solid suspended in a gas and means for the injection of a suspended gas.

Thus, advantageously, a single apparatus according to the invention makes it possible to deposit several thin layers or films, whereas previously it was necessary to use the same number of spraying apparatuses as there were layers to be deposited. Thus, the presence of several compartments supplied with powder and gas independent of one another permits the successive spraying of pulverulent solids of different types onto the substrate.

In addition, due to the fact that the deposits are made in a quasi-consecutive manner, there is no possible cooling risk with respect to the substrate between each of these operations.

In a particularly surprising manner, it is possible to obtain in a single stage several superimposed layers, which have proved to be perfectly homogeneous and separate from one another. It was feared that the different powder jets from each of the compartments would interpenetrate, at least to a partial extent, on leaving the distribution slot close to the substrate, which would have led to the formation in an uncontrolled manner of inhomogeneous layers at very diffuse interfaces.

Preferably, each of the partitions present in the cavity is detachable and height-regulatable with respect to the cavity walls. In order to ensure a perfect separation of the powder jets, the partition can be so positioned that it projects beyond the distribution slot in the direction of the substrate. However, it has been empirically observed that a satisfactory channelling of the powder jets was obtained by merely bringing about a flush arrangement of the partition or partitions and the distribution slot.

However, it is obvious that it is possible to bring about a partial and controlled interpenetration of the powder jets, in order to create diffuse layer interfaces, by positioning the partition or partitions in the cavity in such a way that they are farther away from the substrate than is the distribution slot, so that in the cavity part closest to the substrate, there is a varying size contact zone between the jets.

The partition can have a widely varying construction. Thus, it can be solid, or hollow so that it can be made lighter or so as to permit the circulation of a fluid in it. Preferably, it is formed by one or more metal plates made from a metal having a good high temperature resistance, such as stainless steel.

Each partition defines two walls. The simplest embodiment consists of said two walls being parallel to one another. However, they can at least partly be divergent or convergent in the direction of the substrate. It is also optionally advantageous for the edges of said walls, in the vicinity of the substrate, to be slightly rounded so as to better control the channelling of the powder jets.

In the case of a single partition, the latter is preferably positioned so as to subdivide the cavity into two symmetrical compartments, the two walls of the cavity being advantageously planar and regularly convergent towards the substrate.

If the apparatus is intended to deposit layers on a float glass ribbon which can have a width of several meters, it is preferable to equip the partition with rigidifying elements. They are advantageously positioned outside the cavity, so as not to cause disturbances in the flow of the powder jets towards the ribbon and therefore marks on the surface of the latter. These rigidifying elements are, e.g, in the form of tie rods.

The means for injecting the pulverulent solid suspended in a gas in the supplying compartments preferably have a plurality of supply pipes positioned longitudinally to the cavity and thus ensuring a homogenous distribution of the powder over the entire glass ribbon width.

In the same way, the pressurized gas injection means equipping each of the compartments so as to ensure a good homogenization of the suspended powder preferably have chambers supplied with pressurized gas and issuing into said compartments by openings arranged for the injection of the gas in the direction of the substrate, whereby said openings can, e.g., be in the form of slots optionally connected to the chambers by porous plates, or in the form of apertures which are made in the plates.

Advantageously, the openings are arranged in such a way that the pressurized gas is introduced into the compartment substantially parallel to the wall adjacent to said openings, this arrangement making it possible to optimize both the homogenization and the acceleration of the powder towards the substrate.

The compartments can also be provided with at least one supplementary gas and in particular ambient air, and which is, e.g., located in the vicinity of the pulverulent solid injectors.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a schematic illustration of a first embodiment of a distribution apparatus according to the invention; and FIG. 2 is a schematic illustration of a second embodiment of a distribution apparatus according to the invention.

DESCRIPTION OF THE PREFERRED EMBODIMENTS

Referring now to the drawings, wherein like reference numerals designate identical or corresponding parts throughout the several views, and more particularly to FIG. 1 thereof, in both FIGS. 1 and 2, the apparatus extends above the entire width of a substrate to be coated, the width being between about 50 centimeters and several meters. The substrate and the apparatus perform a translation movement relative to one another. In this case the substrate is a float glass ribbon moving at a speed between, e.g., 6 and 25 meters per minute in accordance with a substantially horizontal plane, the apparatus being placed above the ribbon transversely to its direction of movement and in a substantially vertical plane.

It is obvious that this relative configuration could be different and that, e.g., the apparatus could be inclined in accordance with a plane not perpendicular to the substrate plane. It would then be appropriate to modify as a consequence of this the vocabulary used hereinafter, such as top position, bottom position, height, vertical plane or horizontal plane.

The apparatuses of FIGS. 1 and 2 essentially differ by the means chosen for injecting the pressurized gas, their common features being described first. They are each formed by a nozzle body 1 traversed over its entire length and its entire height by a cavity 2 defined by two walls which converge progressively in the direction of the ribbon of the glass 3 and which terminate at their bottom part by a distribution slot 4 which is approximately 15 to 120 mm, and preferably 20 to 80 mm, from the glass.

In the area close to the distribution slot, the nozzle body contains cooling members such as water circuits for preventing an excessive heating of the nozzle "nose" as a result of its close proximity to the glass ribbon which is generally at a high temperature. It also has reinforcements or crosspieces enhancing the non-deformability of the cavity. It can also have (not shown) tie rods fixed to its walls and distributed over its height in order to reinforce its rigidity and accurately regulate its width.

The cavity 2 is subdivided into two approximately symmetrical compartments 5, 6 by a solid, stainless steel metal plate 7 having a thickness of 5 to 20 millimeters, and preferably approximately 10 mm, and which partitions the cavity 2 over virtually its entire height. The lower part of the metal plate 7 is flush with the distribution slot 4. It is rigidified by tie rods 100 which are positioned outside the cavity 2 so as not to disturb the powder flow towards the glass ribbon 3.

The use of such a partition 7 makes it possible to supply a single distribution apparatus 1 with two different pulverulent solids, each entrained by pressurized gas and whose flows towards the substrate 3 take place in a closely parallel manner. Thus, the substrate is coated with two different or similar thin layers which are superimposed. The partition 7 is height-regulatable.

The bottom of the partition 7 may be flush with the distribution slot 4 to ensure a good separation of the powder jets, but it can also be set back in the cavity 2 or project outside the cavity by one or a few millimeters in the direction of the substrate 3 without causing any interpenetration of the powder jets and consequently without the layers obtained having diffuse interfaces.

Thus, it has surprisingly been observed that the two powder jets arriving in the top part of the compartments 5, 6 by the subsequently described pipes have very different behavioral characteristics on leaving the distribution slot 4 in the direction of the moving glass ribbon.

If the terms upstream and downstream compartments are used as a function of the ribbon movement direction, it has been observed that the powder jet from the upstream compartment 6 has an essentially upstream-directed flow along the glass ribbon, whereas the powder jet from the downstream compartment 5 has an essentially downstream-directed flow along the glass ribbon, an air curtain being established in the extension of the partition 7 and towards the ribbon 3 preventing any contact between the two jets, which therefore separate in two opposite directions along the glass ribbon 3.

If it is wished to have a certain interpenetration to obtain a somewhat diffuse interface, it is then necessary to modify the positioning of the partition 7 in the cavity 2 in such a way that its lowest end is at a much greater distance from the substrate 3 than is the distribution slot 4.

In the embodiments of FIGS. 1 and 2 the partition 7 is in the median plane of the cavity 2, precisely subdividing into two the distribution slot 4 by an overall width between, e.g., 4 and 20 mm. However, it is also possible to position the plate 7 in a non-median plane, thus defining compartments of different widths, which is of interest when, e.g., one of the two layers to be deposited on the ribbon must be much thicker than the other and the flow rate of one of the two pulverulent solids is higher.

In the same way, in this case the partition 7 is a plate with walls parallel to one another. However, it may advantageously have walls which are divergent in the direction of the substrate 3, so that the walls of the compartments 5 and 6 more progressively converge towards one another in the direction of the substrate 3, this being very favorable to a good entrainment of the powder in each of the compartments 5, 6.

Although the partition 7 is here solid, it can also be hollow for weight saving reasons or, e.g., to permit the circulation of a cooling liquid within it.

Each of the compartments 5, 6 is supplied with a pulverulent solid suspended in a gas with the aid of a plurality of supply pipes 8 known as injectors and which are located in the upper part in an orifice 9 extending over the entire length of said compartments, so as to inject a plurality of powder jets suspended in the gas into each compartment defined by the walls of the cavity 2 and the metal plate 7 serving as a partition.

The positions of the injectors 8 are vertically, transversely and laterally regulatable in the orifice 9. The injectors can be oriented perpendicular to the axis of the distribution slot 4. These injectors can also be inclined in a direction not perpendicular to the slot axis. The ends of the injectors 8 corresponding to the powder outlets can be at different levels within each of the compartments 5, 6 in accordance with the desired suspended powder injection conditions, which are dependent on the characteristics of the layer to be obtained on the substrate. Preferably, each end is vertically level with an opening 10 used for injecting the pressurized gas into the cavity. The construction of the opening 10 differs as a function of the two apparatuses.

The injectors 8 have a cross-section smaller than that of the orifice 9 so as to permit the entry of gas, preferably ambient air, into each compartment 5, 6 in the vicinity of the injectors. The number of injectors can vary. It is dependent on the length of the nozzle 1 and is determined in such a way that the line formed by the pulverulent solid on the substrate, on leaving the distribution slot 4, is continuous and uniform. Each injector 8 can, e.g., be approximately 5 cm from the adjacent injector.

In the embodiment of FIG. 1, each of the compartments is also provided with pressurized gas intake means constituted by a chamber 11 supplied with pressurized gas and, e.g., connected by a row of holes 12 to a gas source. The chamber 11 issues into each of the compartments 5, 6 by the opening 10. The opening 10 is preferably located in the vicinity of the injectors 8 and injects air parallel to one of the walls defining the compartments 5, 6.

In this embodiment, the opening 10 is constituted by a plurality of apertures made in the plate 13 extending transversely to the substrate 3. The apertures have axes extending substantially parallel to the wall of the cavity 2 adjacent thereto. These apertures are distributed transversely to the direction of movement of the substrate and preferably in a regular manner. The apertures have a diameter between 0.5 and 3 mm and preferably between 0.8 and 1.3 mm. The distance between the apertures is between 1 and 15 mm and preferably between 5 and 10 mm. The lower end of the apertures is preferably positioned level with the lower end of the injectors 8.

Thus, the pressurized gas is introduced into the compartments 5, 6 in order to entrain the powder and the ambient air from the orifices in which are located the injectors 8. The above configuration is such that the pressurized gas is injected parallel to the wall adjacent to said apertures, in this case the wall of the cavity 2. It is also possible to adopt another configuration where the pressurized gas is injected substantially parallel to the wall of the compartment defined by the partition 7.

In the embodiment of FIG. 2, each of the compartments is provided with pressurized gas intake means having longitudinal blowing slots 10 issuing in the vicinity of the injectors 8 and supplied with pressurized gas in the manner which will now be described. The two halves of the nozzle body located on either side of the cavity 2 are hollow and each forms a series of pressurized gas (generally air) chambers such as 20, each series being connected by a ramp 21 to a gas (generally air) source and each chamber being separated from the adjacent chamber of the same series by a partition 22 forming a spacer with passages 23 made from a porous material of the Poral type, or by expansion slots, thus making it possible to have at the outlet of the final chamber of the series a constant flow rate over the entire nozzle length.

The compressed gas of each series of cavities 20 is injected into the inlet of each compartment 5, 6 by a calibrated longitudinal blowing slot 10 having lips 24 and 25 formed so as to orient the injected gas jet almost parallel to the wall of the cavity 2 and more specifically within an angle with respect to said wall which is below 7°, so that said jet remains attached to the wall. As hereinbefore, it is also possible to inject the gas parallel to the compartment walls defined by the partition 7.

The calibration of the slot 10 is obtained by sliding the plate 26 in a direction perpendicular to the walls of the cavity 2. The gas is injected across the blowing slots 10 at a speed well above that of the powder on leaving the injectors. Advantageously the gas speed is sonic in order to increase the acceleration of the mixture and favor the uniform distribution of the injected gas flow rate over the nozzle length.

The end of the injectors 8 is preferably flush with the blowing slots. The gas injected by the slots entrains external atmosphere into the cavity 2 between the injectors 8, as in the preceding embodiment.

Each of the two apparatuses described hereinbefore was used for depositing on a float glass ribbon a double coating, particularly that described in EP-A-500 445 (U.S. patent application Ser. No. 08/106,779). The coating has a first doped, substoichiometric, metal oxide layer protected by an oxide-based underlayer such as aluminum oxide. The apparatuses according to the invention thus make it possible to "block," in an oxygen substoichiometric state, the doped layer in an optimum manner, because the two deposits are quasi-simultaneous.

The two apparatuses are alternately placed above the 4 mm thick float glass ribbon having a temperature of approximately 600° C. and travelling at a speed of approximately 12 m/min between its departure from the tin bath enclosure and its entry in the lehr. The height of the distribution slots from the glass surface is approximately 40 mm and each of them is subdivided by the partition into two slots, each having a width of approximately 5 mm.

A first series of examples consists of forming a first tin-doped indium oxide layer surmounted by a second aluminum oxide layer.

Each "upstream" compartment is supplied by means of its injectors with a mixture of 90% by weight indium formate and 10% by weight tin dibutyl oxide with a flow rate of 10 kg/hour/linear meter of compartment. The gas in which the mixture is suspended is air having a flow rate of 50 $Nm^3$/hour/linear meter of compartment ($Nm^3$: standardized $m^3$, i.e., brought to normal pressure and temperature conditions).

Each "downstream" compartment is supplied by means of its injectors with an aluminum triisopropylate-based powder at a flow rate of 3 kg/hour/linear meter of compartment. The gas in which it is suspended is air having a flow rate of 50 $Nm^2$/hour/linear meter of compartment.

In addition, each of the compartments is supplied with pressurized gas by blowing slots or apertures, the gas being air and having a flow rate of 200 $Nm^3$/hour/linear meter of compartment. The induced air flow rate is approximately 100 $Nm^2$/hr/linear meter of compartment.

A first 280 nm ITO layer surmounted by a second approximately 90 nm $Al_2O_3$ layer are obtained with emissivity (0.10) and photometric (87% light transmission) properties of a very satisfactory nature, the coating having no significant bloom or iridescence effects.

Another series of deposits is made with a first deposit of fluorine-doped tin oxide $SnO_2$:F surmounted by an aluminum oxide $Al_2O_3$ layer. The difference compared with the preceding series is that each of the "downstream" compartments is here supplied with dibutyl tin difluoride powder at a flow rate of 5.6 kg/hour/linear meter of compartment.

A first 360 nm $SnO_2$:F layer is obtained, which is surmounted by an approximately 80 nm $Al_2O_3$ layer, said coatings having no significant bloom or iridescence effects, good emissivity (0.17) and photometric (83% light transmission and 8% light reflection) properties.

In conclusion, the apparatus with the partitioning system according to the invention makes it possible to obtain several thin layers of very satisfactory quality, while also bringing about a considerable space gain. Moreover, it is very simple to perform and can easily be adapted, because the position and shape of the partitions are adjustable as a function of the desired thin layer stack, the number of layers to be deposited and their relative thicknesses. It can also be modified, because each of the compartments defined by these partitions functions independently of one another. Thus, as a function of needs, it is only necessary to operate some or even one of them. This apparatus can then be substituted in advantageous manner for all the preceding apparatuses, thereby avoiding time-consuming fitting and dismantling of apparatuses. Finally, it requires no modification of the float installation in which it is advantageously located.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. Apparatus for the distribution of pulverulent solids suspended in a gas onto a moving substrate formed by a ribbon of glass to deposit layers on the ribbon of glass by solid pyrolysis, said apparatus comprising:

two walls defining an elongate cavity extending substantially transversely to a movement direction of the substrate, said cavity terminating in a distribution slot adjacent the substrate;

at least one partition in said cavity and positioned so as to divide said cavity into two compartments spaced in the movement direction of the substrate;

pulverulent solid injection means for injecting a pulverulent solid into each of said compartments; and pressurized gas injection means for injecting a pressurized gas into each of said compartments.

2. Apparatus according to claim 1, wherein a height of the partition in the cavity is regulatable.

3. Apparatus according to claim 1, wherein the partition is formed of at least one metal plate.

4. Apparatus according to claim 1, wherein the partition defines two parallel walls, one of said parallel walls being in each of said compartments.

5. Apparatus according to claim 1, wherein the edges of the walls defined by the partition are rounded in the vicinity of the substrate.

6. Apparatus according to claim 1, wherein said compartments are symmetrical.

7. Apparatus according to claim 1, wherein the partition terminates flush with the distribution slot.

8. Apparatus according to claim 1, wherein the partition includes rigidifying elements.

9. Apparatus according to claim 8, wherein said rigidifying elements comprise tie rods located outside of said cavity.

10. Apparatus according to claim 1, wherein the pulverulent solid injection means comprise a plurality of supply pipes positioned longitudinally in each compartment of said cavity.

11. Apparatus according to claim 1, wherein the pressurized gas injection means comprise chambers supplied with pressurized gas and issuing into each of said compartments via openings arranged so as to inject the gas toward the substrate, said openings being in the form of slots connected to the chambers.

12. Apparatus according to claim 11, wherein the openings by which the pressurized gas is injected into the compartments are arranged so as to introduce said gas substantially parallel to a wall of said cavity adjacent to said openings.

13. Apparatus according to claim 11 including an ambient air intake in the vicinity of the pulverulent solid injection means to permit entry of ambient air into said cavity.

14. Apparatus according to claim 11, including apertured plates between said slots and said chambers.

15. Apparatus according to claim 14, wherein said apertured plates comprise porous plates.

16. Apparatus according to claim 1, wherein the partition defines two walls, one of said partition walls being in each of said compartments, said partition walls being at least partially convergent in the direction of the substrate.

17. Apparatus according to claim 1, wherein the partition defines two walls, one of said partition walls being in each of said compartments, said partition walls being at least partially divergent in the direction of the substrate.

* * * * *